US012693187B2

(12) United States Patent
Dupont

(10) Patent No.: US 12,693,187 B2
(45) Date of Patent: Jul. 28, 2026

(54) TIME SYNCHRONIZED LEAK DETECTION SYSTEM

(71) Applicant: Kamstrup A/S, Skanderborg (DK)

(72) Inventor: Sune Hoveroust Dupont, Skanderborg (DK)

(73) Assignee: KAMSTRUP A/S, Skanderborg (DK)

( * ) Notice: Subject to any disclaimer, the term of this patent is extended or adjusted under 35 U.S.C. 154(b) by 308 days.

(21) Appl. No.: 18/563,411

(22) PCT Filed: May 25, 2022

(86) PCT No.: PCT/DK2022/050110
§ 371 (c)(1),
(2) Date: Nov. 22, 2023

(87) PCT Pub. No.: WO2022/248006
PCT Pub. Date: Dec. 1, 2022

(65) Prior Publication Data
US 2024/0219257 A1 Jul. 4, 2024

(30) Foreign Application Priority Data
May 26, 2021 (EP) ..................................... 21175930

(51) Int. Cl.
*G01M 3/24* (2006.01)
*E03B 7/00* (2006.01)
*F17D 5/06* (2006.01)
(52) U.S. Cl.
CPC .............. *G01M 3/24* (2013.01); *E03B 7/003* (2013.01); *F17D 5/06* (2013.01)

(58) Field of Classification Search
CPC ............ G01M 3/00; G01M 3/16; G01M 3/18; G01M 3/24; E03B 7/00–04; E03B 7/003; F17D 5/00; F17D 5/02; F17D 5/06
See application file for complete search history.

(56) References Cited

U.S. PATENT DOCUMENTS

| | | | | |
|---|---|---|---|---|
| 9,677,966 | B2* | 6/2017 | Cho ...................... | H04W 84/18 |
| 2015/0002300 | A1* | 1/2015 | Cho ...................... | H04J 3/0667 |
| | | | | 340/605 |
| 2015/0204701 | A1* | 7/2015 | Klicpera ................. | G01M 3/00 |
| | | | | 137/624.11 |

(Continued)

OTHER PUBLICATIONS

Extended European Search Report dated Nov. 17, 2021, for European Application No. 21175930.3.

(Continued)

*Primary Examiner* — Nguyen Q. Ha
(74) *Attorney, Agent, or Firm* — Renner, Otto, Boisselle & Sklar, LLP

(57) ABSTRACT

Fluid consumption meter comprising a noise detection module for leak detection measurements and a control device comprising a bi-directional communication unit. The control comprises a time synchronization module for time synchronization of leak detection measurements with an external device via the bi-directional communication unit with a time synchronization error of less than 1000 micro seconds. The control device is arranged to receive a leak detection control signal from an external device and to start the leak detection measurements at a point in time specified the received leak detection control signal.

19 Claims, 6 Drawing Sheets

(56)     References Cited

U.S. PATENT DOCUMENTS

2018/0320828  A1*   11/2018   Lander ...................... G06F 1/14
2020/0213688  A1      7/2020   Solomon et al.
2022/0240191  A1*    7/2022   Bohrer ................... G01D 21/00

OTHER PUBLICATIONS

International Search Report and Written Opinion mailed Aug. 5, 2022, for International Application No. PCT/DK2022/050110.

* cited by examiner

120: 121,122

110: 111,112

50

40

60

20

300

100

120: 121,122

110: 111,112

102

TIME SYNCHRONIZED LEAK DETECTION SYSTEM

This application is a national phase of International Patent Application No. PCT/DK2022/050110 filed May 25, 2022, which claims priority to European Patent Application No. 21175930.3 filed May 26, 2021, each of which is hereby incorporated herein by reference in its entirety.

FIELD OF THE INVENTION

The invention relates to a fluid consumption meter comprising an acoustic noise detection module and to a leak detection system and a method for leak detection in a utility distribution network. Generally, the present invention relates to methods and systems for determining a present state of a pipe system by use of acoustic sensors which are synchronized in time to provide time coincident acoustic noise sampling and detection for leak detection.

BACKGROUND OF THE INVENTION

The water loss in a utility water distribution system approaches fifty percent. This is not only a loss of a scarce natural resource itself. Distribution of water is also very energy consuming and thus by reducing water loss, energy consumption as a whole can be reduced.

It is known that leaks in a fluid distribution system can be detected by measuring acoustic signals, also just called noise or acoustic noise, travelling in the fluid or pipes of the fluid distribution system. Today, determining the present state of water utility distribution system or a subsystem or section thereof, such as to be able to identify leaks, is a cumbersome process requiring installation of additional equipment and a lot of manual work to be performed on the field. Determining a present state of a pipe system or subsystem may for example require multiple steps and access to the pipe system at the point of consumption and at the point of location of a district valve, supply line valve, connection valve, etc. for installation of a leak detection sensor. Often a limit number of leak detection sensors are installed and moved between different installation places in the utility distribution system. Noise measurements e.g. in form of acoustic noise energy are measured at different points in time and correlated to detect a leak.

It is the object of the invention to provide an improved fluid consumption meter and an improved leak detection system allowing a simplified, energy conserving, more precise and more sensitive leak detection in a pipe system. This object is achieved by a fluid consumption meter having the features defined in claim 1, by a leak detection system having the features defined in claim 9 and a by a method for leak detection in claim 12. Preferred embodiments are defined in the subclaims, the following description and the accompanying drawings.

SUMMARY OF THE INVENTION

Thus, the above described object and several other objects are intended to be obtained in a first aspect of the invention by providing a fluid consumption meter configured to measure a flow rate of a fluid and comprising; a noise detection module for leak detection measurements, and a control device comprising a bi-directional communication unit being a cellular communication modem, characterized in that: the control device comprises a time synchronization module for time synchronization of leak detection measurements with an external device via the bi-directional communication unit with a time synchronization error of less than 1000 micro seconds; and in that the control device is arranged to receive a leak detection control signal from an external device via said bi-directional communication unit and to start the leak detection measurements at a point in time specified in a measurement synchronization information comprised in the received leak detection control signal and to transmit leak detection measurement data from said leak detection module via said bi-directional communication unit.

By leak detection measurement is understood that the noise detection module measures acoustic signals or acoustic noise. The noise detection module may be arranged for detecting acoustic noise or acoustic signals travelling in the fluid flowing through the consumption meter or along pipes to which the consumption meter is connected. The noise detection module may as such be an acoustic noise detection module. The noise detection module comprises a acoustic sensor. The noise detection module may use a piezo electric transducer as an acoustic sensor or a hydrophone. Acoustic noise may be understood as any acoustic signal or sound wave travelling in the fluid or pipes. Optionally the consumption meter may use ultrasonic transducers which are also used for flow rate measurements for the acoustic noise detection. In the following noise detection module and acoustic sensors will be used interchangeably.

The bi-directional communication unit may be any communication unit capable of time synchronization. The communication unit may be a 5G cellular modem or another generation of a cellular communication modem. Especially a 5G cellular modem is advantageous in that it supports high precision timing. As an alternative a communication unit supporting proprietary communication protocols may be used. As yet another alternative or supplement the communication module may support wireless MBus, Zigbee, Bluetooth, LORA, Zigbee, Sigfox, NFC, UWB or other suitable communication technologies.

The bi-directional communication unit is preferably a wireless communication unit. This has the advantage that no electrical connections to the fluid consumption meter is required, whereby the fluid consumption meter may be constructed as a sealed water tight unit suitable for installation in a meter pit. Meter pits may have a high relative humidity and may be flooded. Optionally the fluid consumption meter is a sealed hermetically closed self-contained device comprising a battery.

The bi-directional communication unit is arranged for time synchronization through a wireless network, preferably such as a cellular network e.g. a 2G, 3G, 4G or 5G cellular network. A 5G network is especially advantageous because it supports high precision time synchronization. Advantageously the bi-directional communication unit is 5G cellular modem supporting high precision timing with a time synchronization error in the range from 100 to 10 micro seconds or less than 100 micro seconds, preferably less than 10 micro seconds or even more preferably less than 1 micro second.

The bi-directional communication unit is preferably not a GPS (Global Positioning System) receiver. Since GPS relies on satellite communication which does not work or is highly unreliable underground e.g. in a meter pit or in a basement of a building other methods for time synchronization with higher underground reliability are advantageous. In other words the bidirectional communication unit preferably supports radio communication in a frequency band below 2.4 GHz more preferably below 2 GHz most preferably below 1 GHz. Communication in communication bands with a lower frequency provides a better penetration into e.g. a metering pit. Preferably the bi-directional communication unit does not use satellite communication.

It is to be understood that the time synchronization module synchronize the leak detection measurements with an external device based on a signal received from or via the bi-directional communication unit. Optionally the time synchronization module is synchronized with an external device based on a signal received from or via the bi-directional communication unit. In other words the time synchronization module may comprises a timer which is synchronized with an external device based on a signal received from or via the bi-directional communication unit The consumption meter is especially advantageous in that an external device can be used for controlling the consumption meter to start leak detection measurements at a specified time with high precision. Controlling with high precision the time for leak detection measurements is advantageous in that more than one meter and/or leak detection sensor independent from a consumption meter may be controlled to do time coincident or simultaneous leak detection measurements or noise measurements whereby the leak detection measurement data transmitted from the consumption meter is suitable for advanced signal processing using data collected across several leak detection sensors such as leak detection sensors which are external to a consumption meter and leak detection sensors which are embedded in consumption meters.

Optionally the consumption meter is a battery operated consumption meter such as a water meter, gas meter or district heating meter/heat energy meter.

Optionally the time synchronization module is arranged for time synchronization of leak detection measurements with a time synchronization error of less than 100 micro seconds, preferably less than 10 micro seconds or even more preferably less than 1 micro second. Such high precision time synchronization of the leak detection measurements are especially relevant for doing simultaneously leak detection or noise measurements across multiple leak detection sensors which may be integrated in a consumption meter or external to a consumption meter. Using high precision synchronization supports simultaneously noise detection and if the precision of the synchronization is sufficient even time coincident sampling of the noise signal. Further the very precise synchronization has the advantage that a temporal overlap of leak detection periods between two or more consumption meters or leak detection sensors independent from a consumption meter are ensured for most of the noise detection period. If noise detection duration is 500 milli seconds and the precision of the synchronization is 1000 micro seconds a maximum of 0.4% of the detection duration will be not be time coincident which has the effect that the detection duration can be kept short since there is no need to extend the detection duration to ensure a sufficiently long time coincident detection duration, this has the advantage of reducing energy consumption in the leak detection sensor which may be embedded in a battery operated device or consumption meter. A further advantage of keeping detection duration short arises if the noise detection transducers are also used for flow rate measurements since the flow rate cannot be measured during acoustic noise detection periods. Thus, the invention is especially advantageous for a leak detection system comprising leak detection sensors embedded in a consumption meter and reusing flow sensors such as piezo electric transducers for noise detection combined with leak detection sensors independent form a consumption meter because the leak detection measurement duration of the consumption meter can be reduced.

The time synchronization module may be a combined module comprising elements from the communication unit and elements from the control device or the synchronization module may be a feature included in a cellular modem such as a cellular modem supporting 2G, 3G, 4G or 5G mobile communication. Especially the time synchronization module may be a part of or include parts of a 5G cellular modem such as Quectel RM50xQ. As an alternative the time synchronization may be implemented based on another communication protocol such as wireless MBus (EN13757-4 2019), Zigbee, Bluetooth, Bluetooth LE, LORA, Sigfox or proprietary communication protocols.

The external device may be smart phone, tablet or another handheld device preferably support ting cellular communication technologies as mentioned above. Alternatively the external device may be a collector or concentrator or any kind of base station such as a base station for public cellular communication. In a preferred embodiment the external device is a server or a cloud device running a leak detection application.

The leak detection control signal may be a single data packet or optionally multiple data packets comprising timing information specifying a specific point in time for starting the leak detection measurements. The point in time may be a relative time relating to the timing or time of reception of at least one leak detection control signal or alternatively the point in time may be an absolute time relating to a "Real Time Clock".

The fluid consumption meter may optionally further comprise a Real Time Clock (RTC). The RTC may be an integrated part of the bi-directional communication unit such as a cellular modem. The RTC may be arranged to be synchronized via the bi-directional communication unit by a base station, such as a public cellular network base station, or by the external device. The time synchronization module may optionally comprise a Real Time Clock.

The real time clock may be arranged for synchronization with an external device with a time synchronization error of less than 1000 micro seconds, preferably less than 100 micro seconds or even more preferably less than 10 micro second or most preferably less than 1 micro second.

The time synchronization module or the RTC being arranged for synchronization with an external device with a time synchronization error of less than 1000 micro seconds is to be understood as after synchronization there will be a difference between the RTC and the external device of less than 1000 micro seconds or the expected time of starting a leak detection measurement will at deviate less than 1000 micro seconds from the expected time.

In other words the time synchronization has an accuracy better than 1000 or 100 or 10 or 1 micro seconds.

Optionally the leak detection measurements are performed for a time duration specified in a duration information comprised in the received leak detection control signal. In other words the noise detection duration may be specified in a duration information comprised in the received leak detection signal. The leak detection signal may comprise a time duration information arranged to specify the time duration of a leak detection measurement. The noise detection module may be arranged to do leak detection measurements for a time duration specified in a duration information comprised in the leak detection control message.

Optionally the noise detection module is further arranged to sample and convert the detected noise signal whereby a digital representation of the noise signal is established. The noise detection module may comprise an analogue to digital converter arranged to acquire a digital representation of the noise signal.

In an embodiment the control device or noise detection module is arranged to start the leak detection measurement such that the sampling time is synchronized with the measurement synchronization information comprised in the received leak detection control signal. This has the advantage that the very precise synchronization enables time coincident or close to time coincident sampling across multiple consumption meters or leak detection sensors independent of a consumption meter.

Optionally the noise detection module is arranged sample the detected noise signal with a sampling interval larger than 50 micro seconds, preferably larger than 100 micro seconds or more preferably larger than 200 micro seconds. In other words the noise detection module is arranged sample the detected noise signal with a sampling rate lower than 20 kHz, preferably lower than 10 kHz or more preferably lower than 5 kHz. Since the highest frequency of interest for acoustic noise detection in some application is 1 kHz or 2 kHz the required sampling rate is according to the Nyquist criterion is 2 kHz or 4 kHz respectively. Thus in a preferred embodiment a sampling rate of 1 kHz or 2 kHz equal to a sampling interval of 1000 micro seconds or 500 micro seconds respectively. Thus a sampling rate of 2048 Hz or lower or of 1024 Hz or lower may be preferred. A low sampling rate has the advantage of minimizing the amount of data generated during leak detection measurements where by storage may be minimized and energy consumption for transmission of data and for doing calculations on the data is minimized.

Optionally the sampling interval is at least the double of the time synchronization error preferably five times larger than the time synchronization error more preferably ten times larger than the time synchronization error, in other words optionally the sampling interval is at least the double of the maximum time synchronization error preferably at least five times larger than the maximum time synchronization error more preferably at least ten times larger than the maximum time synchronization error. Keeping the sampling interval lager than the synchronization error has the advantage the noise detection modules across a population of utility meters and/or independent leak detection sensors will sample the noise signal at coincident or close to coincident points in time whereby a more accurate leak detection calculation may be performed on the leak detection data.

A noise detection module for leak detection measurements may be understood as a module for acoustic noise measurements suitable for use in leak detection. In other words a noise detection measurement is a leak detection measurement. So the measurements made by the noise detection module results in noise measurement data for leak detection also called leak detection measurement data. The noise detection module is arranged to generate noise measurement data for leak detection. Especially the noise measurement data may be used for leak detection calculations. By noise measurement is understood acoustic noise measurement.

The control device may be arranged to transmit leak detection measurement data autonomously or after being requested to transmit the data via the bi-directional communication interface. The control device may store the leak detection measurement data in an internal memory device comprised in the control device before transmission and transmission may be delayed until a time period after ending the leak detection measurements. Optionally the leak detection measurement data transmitted from the control device is the digital representation of the noise signal measured by the noise detection module. The digital representation of the noise signal may be compressed or compacted before transmission. As an alternative the leak detection measurement data transmitted may be a statistical value calculated based on the digital representation of the noise signal. The statistical value may be an average or RMS value or a noise power value. As another alternative the transmitted leak detection measurement date may be a Fourier transform of the digital representation of the noise signal. In an optional embodiment the control device may be arranged to transmit noise detection data represented by one or more statistical values, such as a noise power value or a value related to the noise power, autonomically whereas the digital representation of the noise signal is only transmitted after being requested by the external device.

Optionally the bi-directional communication unit is a cellular modem such as a 5th generation cellular communication interface for public cellular networks.

In a second aspect of the invention is provided leak detection sensor being independent from a consumption meter. The independent leak detection sensor is understood to have all the same elements as described above for the consumption meter in the first aspect of the invention except from the independent leak detection sensor not being configured for measuring a flow rate of a fluid. The independent leak detection sensor is understood to be a leak detection sensor which is separate from a consumption meter. The independent leak detection meter may additional comprise fastening means for releasable attachment or temporary attachment to a valve or pipe of a utility distribution network. The fastening means may be a magnet or brackets arranged for mechanically connecting the independent leak detection sensor to an element of the utility distribution network such as a valve or a pipe section.

A leak detection sensor being independent from a fluid consumption meter may comprise: a noise detection module for leak detection, and a control device comprising a bi-directional communication unit being a cellular communication modem, wherein the control device comprises a time synchronization module for time synchronization of leak detection measurements with an external device via the bi-directional communication unit with a time synchronization error of less than 1000 micro seconds; and in that the control device is arranged to receive a leak detection control signal from an external device via said bi-directional communication unit and to start the leak detection measurements at a point in time specified in a measurement synchronization information comprised in the received leak detection control signal and to transmit leak detection measurement data from said leak detection module via said bi-directional communication unit. The independent leak detection sensor may additional comprise all features of the utility meter according to the first aspect of the invention.

In a third aspect of the invention, a leak detection system for leak detection in a fluid supply system or a pipe system or pipe subsystem, respectively is subject of the present invention. It is to be understood that preferred and optional features of the fluid consumption meter described above in the first aspect and the independent leak detection sensor in the second aspect should be regarded as preferred or optional embodiments of the leak detection system, too. Furthermore, preferred or optional features of the leak detection system described in the following can be regarded as preferred or optional embodiments of the fluid consumption meter or independent leak detection sensor, too.

The third aspect of the invention provides a leak detection system for leak detection in a fluid supply system comprising: one or more fluid consumption meters according to the first aspect of the invention, and an external device having at least one bi-directional communication device comprising a time synchronization module for time synchronization of measurements with a time synchronization error of less than 1000 micro seconds, wherein the external device is configured for communication with the communication unit of one or more fluid consumption meters, and to send the leak detection control signal comprising measurement synchronization information to said one or more fluid consumption meters whereby leak detection measurements are time synchronized.

Optionally the leak detection system according to the third aspect may, further comprise at least one leak detection sensor being independent from a fluid consumption meter, the leak detection sensor comprising: a noise detection module for leak detection, and a control device comprising a bi-directional communication unit being a cellular communication modem, wherein the control device comprises a time synchronization module for time synchronization of leak detection measurements with an external device via the bi-directional communication unit with a time synchronization error of less than 1000 micro seconds; and in that the control device is arranged to receive a leak detection control signal from an external device via said bi-directional communication unit and to start the leak detection measurements at a point in time specified in a measurement synchronization information comprised in the received leak detection control signal and to transmit leak detection measurement data from said leak detection module via said bi-directional communication unit.

As a consequence is provided a leak detection system for leak detection in a fluid supply system comprising: one or more leak detection sensors such as fluid consumption meters according to the first aspect of the invention and/or one or more leak detection sensor being independent from a consumption meter according to the second aspect of the invention, and an external device having at least one bi-directional communication device comprising a time synchronization module for time synchronization of measurements with a time synchronization error of less than 1000 micro seconds, wherein the external device is configured for communication with the communication unit of one or more leak detection sensors, and to send the leak detection control signal comprising measurement synchronization information to said one or more leak detection sensors whereby leak detection measurements are time synchronized The leak detection system has the advantage that multiple leak detection sensors in form of independent leak detection sensors or leak detection sensors embedded in a consumption meter may be controlled to start leak detection measurements at the same time to do coincident or simultaneously noise detection whereby the collected noise detection data has a high quality due to the concurrency of the leak detection measurements which enables high precision leak detection calculations. A further advantage is that the leak detection measurement duration is kept short due to the high precision synchronization.

The external device may be smart phone, tablet or another handheld device preferably support ting cellular communication technologies such as $3^{rd}$, $4^{th}$ or $5^{th}$ generation public cellular communication technologies (3G, 4G, 5G cellular communication). Alternatively the external device may be a collector or concentrator or any kind of base station such as a base station for public cellular communication. In a preferred embodiment the external device is a server or a cloud device running a leak detection application. Preferably the external device being an application in a sever context is accessible via a hand held device such as a smart phone, tablet or laptop. The external device may have a user interface for selection of leak detection sensors to which a leak detection control signal shall be transmitted. The external device may have a graphical user interface for displaying leak detection sensors and optionally the utility distribution network to assist an operator in selection of leak detection sensors to which a leak detection control signal shall be transmitted. Further the user interface may be used for displaying an estimated location of a leak in the utility distribution network.

Optionally the external device is arranged to transmit individual leak detection control signals to the consumption meters or leak detection sensors. Alternatively the leak detection control signals are broadcast to the leak detection sensors.

Optionally the external device is arranged to transmit leak detection control signals to at least one fluid consumption meter and at least one leak detection sensor being independent from a fluid consumption meter, wherein the leak detection control signals comprises measurement synchronization information specifying a coincident in time for starting the noise detection which is coincident for the at least one fluid consumption meter and the at least one leak detection sensor being independent from a fluid consumption meter. Optionally the external device is arranged to transmit a synchronization signal to the fluid consumption meter for synchronization of a Real Time Clock (RTC) comprised in the consumption meter.

Synchronizing an independent leak detection sensor and a leak detection sensor embedded in a consumption meter may especially be advantageous in cases where the independent leak detection sensor has more battery power or more sensitive acoustic sensors whereby the precision of the leak detection system may be improved by combining noise detection data from a consumption meter and an independent leak detection sensor.

Optionally the bi-directional communication between the external device and the communication unit of one or more fluid consumption meter is: a direct communication between the two devices according to a communication protocol such as wireless MBus (EN13757-4 2019), Zigbee, Bluetooth, Bluetooth LE, LORA, Sigfox or proprietary communication protocols or an indirect communication between the two devices via a public cellular communication network. Direct communication between the fluid consumption meter has the advantage of being a cheap and subscription less communication link having better low power properties than a public cellular communication network. In an advantageous configuration the external device is configured for: indirect communication with the at least one independent leak detection sensor via a public cellular network, and direct communication with the consumption meter via a direct communication protocol such as wireless MBus (EN13757-4 2019), Zigbee, Bluetooth, Bluetooth LE, LORA, Sigfox or proprietary communication protocols.

By an indirect communication is understood that communication between the external device and the consumption meter or leak detection sensor is taking place via a base station such as a base station of a public cellular communication network. By direct communication is understood that the communication takes place by direct transfer between an external device and the consumption meter.

A leak detection system according to the invention can be used in a fluid supply system, i.e. in a pipe system and in particular a pipe subsystem. The leak detection system comprises one or more fluid consumption meters as described above. In particular the leak detection system may comprise a plurality of fluid consumption meters which may selectively be used for leak detection. For this there is provided an external device, in particular in form of a remote control or external device having a communication device configured for communication with the communication unit of one or more of the described fluid consumption meters. The remote control or external device is configured to send out a leak detection control signal to one or more fluid consumption meters and may receive the leak detection measurement data transmitted by one or more fluid consumption meters recorded in their leak detection mode, as described above. In particular the remote control may be configured to send selected addresses identifying certain fluid consumption meters which are desired to be set into the leak detection mode. Those fluid consumption meters, receiving their address in a leak detection control signal, then, switch into a leak detection mode carrying out leak detection and/or transmitting leak detection measurement data on basis of the detected noise, as described above. In particular there may be provided many fluid consumption meters in a water distribution network and it is possible to select those fluid consumption meters for leak detection which are close to an assumed leak in the pipe system. By leak detection using a noise detection of the selected fluid consumption meters the leak can be localized. Furthermore, the leak detection system may comprise at least one leak detection sensor being independent from a fluid consumption meter, the leak detection sensor having a communication unit configured to transmit leak detection measurement data to the external device or remote control. Also, the leak detection sensor may be configured such that it offers a possibility to put the leak detection sensor into a leak detection mode similar to the leak detection mode as described above in relation to the fluid consumption meter. The leak detection sensor may for example be an independent leak detection sensor arranged on a distribution pipe of the network. This may be a leak detection sensor permanently attached to the pipe or leak detection sensor just being attached for leak detection in a certain area of the pipe system. The leak detection sensor is configured to carry out a noise detection and to transmit data similar as the fluid consumption meter in its leak detection mode. However, it may be possible that the data from the leak detection sensor differ from the data transmitted from said fluid consumption meter. For example, the data transmitted from the leak detection sensor has an improved or higher resolution, higher sampling rate, an improved or greater dynamic range. Furthermore, the leak detection sensor may have an improved sensitivity compared to the noise sensor or noise detection module in the fluid consumption meter. The data provided by the independent leak detection sensor may be analysed together with data received from one or more fluid consumption meter. Combining data from the two type of sensors is advantageous in that they may be placed at different locations in the utility distribution network. The leak detection sensors embedded in the consumption meter are located close to the consumption site, such as a house hold or e.g. industrial building, whereas the independent leak detection sensor may be installed in or at the main supply lines in the utility distribution network. The variation in location and leak detection measurement data from the various leak detection sensors enables improved leak detection when combined. Preferably said leak detection sensor is configured to receive a leak detection control signal from an external device, for example a remote control as described before, via said communication unit and to transmit leak detection measurement data in response to this leak detection control signal. Thus, the external device or remote control may activate the independent leak detection sensors similar as the fluid consumption meters for leak detection so that the external sensors can be used together with fluid consumption meters for leak detection.

In a fourth aspect of the invention is provided a method for leak detection in a water utility distribution network comprising an external device or remote control and a plurality of leak detection sensors comprising: a noise detection module for leak detection, and a control device comprising a bi-directional communication unit being a cellular communication modem and comprising a time synchronization module for time synchronization of measurements with a time synchronization error of less than 1000 micro seconds; the method comprising the steps of: transmitting from an external device or a remote control to a plurality of leak detection sensors a leak detection control signal comprising a measurement synchronization information specifying a point in time for starting leak detection measurements; receiving in the plurality of leak detection sensors the leak detection control signal; starting in the plurality of leak detection sensors the noise detection at the point in time specified in the measurement synchronization information comprised in the received leak detection control signal, whereby noise measurements in the plurality of leak detection sensor are time synchronized; sending from the plurality of leak detection sensors to the external device or remote control leak detection measurement data measured by the noise detection module.

The plurality of leak detection sensors may be one or more consumption meters according to the first aspect of the invention and/or one or more independent leak detection sensors according to the second aspect of the invention. In other words the plurality of leak detection sensors according to the method may comprise at least one leak detection sensor embedded in a consumption meter and at least one leak detection sensor being independent from a consumption meter.

Optionally the data send to the external device or remote control from the plurality of leak detection sensors are analysed or correlated to detect a leak or to detect the position of a leak. Due to the time synchronization of the leak detection measurements the accuracy of the leak detection calculations may be improved due to the time coincident noise measurement.

Optionally the method may comprise a step of selecting a subset of the leak detection devices to which the leak detection control signal is sent. In other words the method may comprise a step of sending the leak detection control signal to a subset of the leak detection devices.

The method for leak detection may be understood as a method for acquiring or improving noise measurement data for leak detection in a utility distribution network.

The method may further comprise a step wherein the leak detection devices determines their own location by use of a GPS receiver or information received by a cellular network and transmits location data to the external device. The method may optionally comprise a further step wherein the external device groups the leak detection devices according to location data.

Optionally the time synchronization module of the external device of the third and fourth aspect of the invention is arranged for time synchronization of leak detection measurements with an time synchronization error of less than 100 micro seconds, preferably less than 10 micro seconds or even more preferably less than 1 micro second. The communication unit of the external device in the third and fourth aspect of the invention may be a cellular communication unit for public cellular network communication such as 3G, 4G or 5G communication.

BRIEF DESCRIPTION OF THE FIGURES

Embodiments of the invention will be described in the figures, whereon.

DETAILED DESCRIPTION OF AN EMBODIMENT

Figures 1A, 1B:
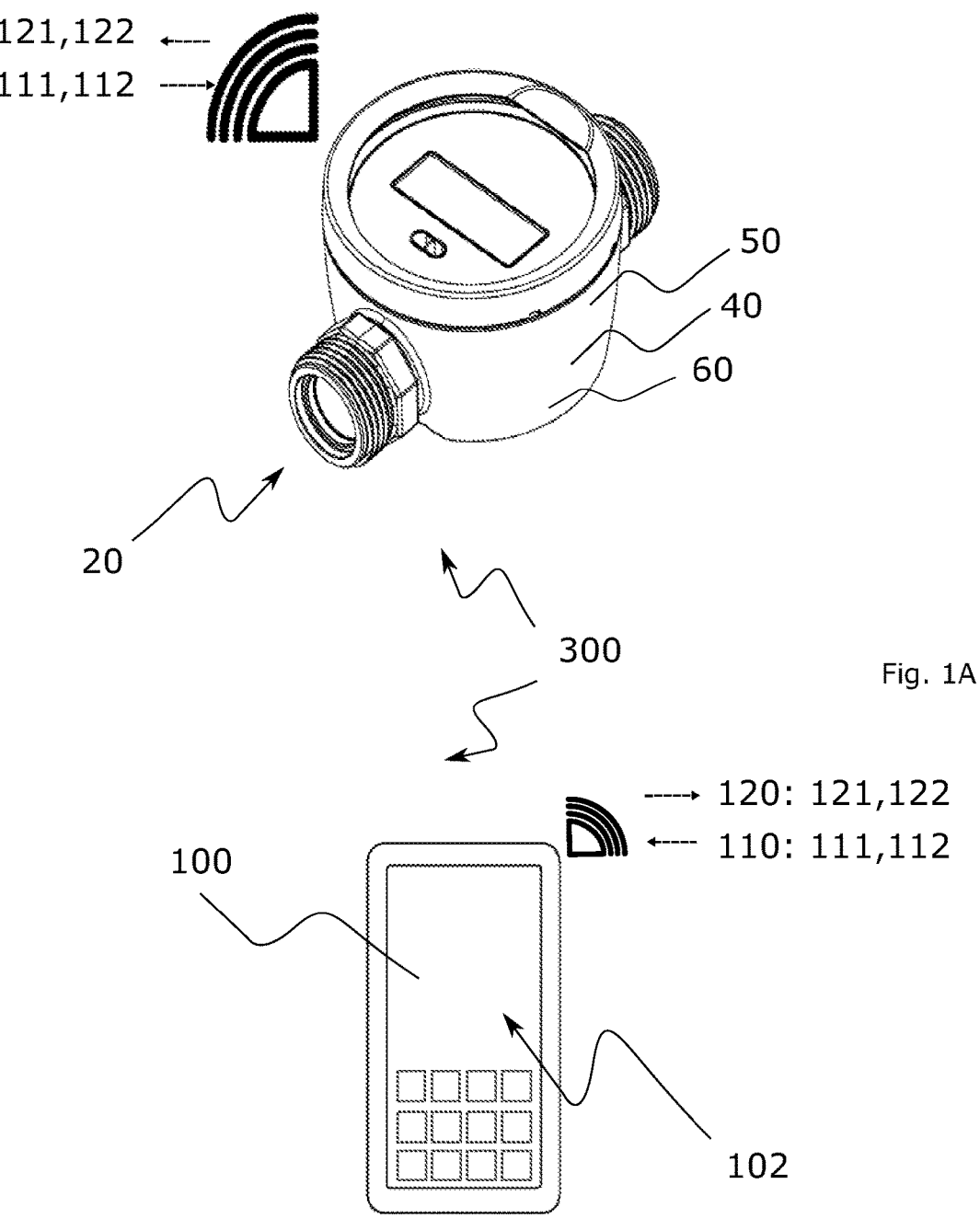
FIGS. 1A and 1B illustrate an acoustic sensor and an external device.

FIG. 1A illustrates an exemplary embodiment of an implementation of a noise detection module in the form of an acoustic sensor 40 integrated into a fluid consumption meter 50. The acoustic sensor 40 is adapted for being connected to the pipe subsystem 20 and is configured to measure leak detection measurement data 120 in the form of acoustic noise or acoustic signals from the fluid flow in the pipe subsystem 20. Based on the measurements of acoustic noise, the acoustic sensor 40 is configured to establish measures of noise 120 also referred to as state noise measures 121 and baseline noise measures 122. The noise measures may be established by a processing unit in the acoustic sensor or in a processing unit in the consumption meter 50 in which the sensor is included. If the acoustic sensor 40 is an integrated part of the consumption meter 50, a common processing unit, also used to determine flow and consumption by the consumption meter 50, may also be used to establish the noise measures.

The consumption meter 50 also comprises a control device comprising a bi-directional communication unit 60 and a time synchronization module arranged to control the timing of leak detection measurements. The control device may be an integrated part of a common processing unit. The control device control the leak detection module/acoustic sensors 40 based at least on commands received via the bidirectional communication interface 60 and by use of the time synchronization module. The time synchronization module includes a timer, which may be a free running timer or a Real Time Clock (RTC). The RTC is synchronized via the bi-directional communication unit 60 by a synchronization mechanism supported by the protocol according to which the bi-directional communication unit operates. Especially bi-directional communication units 60 in form of modems for connection to public cellular communication networks e.g. 3G, 4G or 5G mobile communication infrastructures provides such time synchronization functionality. In case of a free running timer the synchronisation is done by including a time offset field in a data packet send to bi-directional communication unit 60, the time offset field shall then specify the time offset for starting leak detection measurements relative to the reception time of the receive data packet.

The noise measure or leak detection measurement data 120 established may be comprise one or multiple values determined by the acoustic sensor/noise detection module 40. The acoustic sensor 40 may be a dedicated acoustic sensor, such as a transducer including a piezoelectric element, or it may be based on another sensor technology known in the art, such as being a capacitive sensor, an inductive sensor, an optical sensor, or a piezoresistive sensor, such as a piezoresistive strain gauge. The acoustic sensor 40 may also be a transducer including a piezoelectric element that is also used for ultrasonic flow measurements, for example according to a time off light principle.

Measuring noise or the acoustic profile to establishing a noise measure, using a dedicated acoustic sensor or a transducer used for ultrasonic flow measurements is further described in the earlier published patent application by the applicant, International publication number WO 2017/005687.

The output from the acoustic sensor 40 is one or more electrical signals, either analogue or digital. To suppress undesired frequencies (such as the mains frequency) or focus on a specific frequency band, like 10 1000 Hz, analogue electrical signals from the acoustic sensor may be electronically filtered. These electronic filters may be high pass filters, low pass filters, notch filters, comb filters and band pass filters. The electrical filters may be simple first order RC filters or cascaded versions of such. Higher order filter types like LCR may also be used. Following the initial electronic filtering, analogue evaluation components like peak detectors, RMS detectors or switchable filters may be implemented resulting in one or a plurality of values indicative of the noise.

Following electronic filtering and optionally analogue evaluation, the signal may be digitized using an analogue to digital converter (ADC) with a bandwidth chosen to match the bandwidth of the electronic filtering. Alternatively, the analogue signal may also be converted from analogue to digital without electronic filtering and analogue evaluation. In one embodiment the bandwidth of the ADC is 2 kHz but other bandwidths, such as 200 Hz-5 kHz may be applied. The overall sampling time may range from approximately 100 milliseconds (ms) to 1 second or more. In one embodiment the sampling period is approximately 250 ms resulting in a frequency resolution of 4 Hz when the ADC bandwidth is 2 kHz. The sampling rate is selected to support the highest frequency in the filtered noise signal, according to the Nyquist limit.

The noise measurement data 120, 121, 122 may be a collection of raw sampled data. A reduction of parameters or data in the noise measurement data could be done through digital data processing of the converted output from the acoustic sensor 40. It may specifically be a simple maximum or a root mean square (RMS) calculation to provide a value representing a measure of the overall noise level. E.g. in a selected frequency band, such as 10-1000 Hz. In another example the noise measure 120, 121, 122 may be a statistical analysis of the raw sampled data including the mean, standard deviation and higher order moments. More sophisticated analysis could also establish the noise measure or noise measurement data through frequency filtering into certain frequency bands, followed by an RMS calculation, to provide a range of noise figures associated with different frequency bands. Frequency filtering may also be introduced in order to remove unwanted known frequencies like the mains frequency.

Furthermore, a full Fast Fourier Transform (FFT) may be performed to provide a full spectrum of acoustic signals, involving noise power density as well as associated phase information. The latter level of analysis may be desirable, in order to perform a cross correlation calculation with the purpose of triangulating the location of the noise source. However, for many practical purposes the information coming from the simpler noise figure calculations suffices to indicate the position of the noise source.

Throughout all the different noise measure generation methods digital filtering could be applied. Some examples are, but not limited to, FIR filters and IIR filters. The filter characteristic could be high pass filters, low pass filters, notch filters, comb filters and band pass filters. Known undesired frequencies, such as the grid frequency, could also be suppressed in this way.

To create more historical knowledge an additional long time evaluated noise measure may be generated from multiple noise measures created by the acoustic sensor. The period between sampling each noise measure may be substantially longer than the time involved in creating a single noise measure. Such noise measure may be one single value indicative of an average type noise level.

For advanced leak detection calculations the raw sampled noise measurement data 120, 121, 122 may be transmitted to an external device 100 for further calculation. The noise measurement data 120, 121, 122 may be compressed before transmission e.g. by use of a Lempel Ziv algorithm or another loss less compression algorithm. By transmitting the leak detection measurement data as raw sampled acoustic noise data a more advanced calculation is possible in the external device 100 since the full data is transferred to the external device without any data loss.

Furthermore, the acoustic sensor/noise detection module 40 may be arranged to calculate a plurality of values indicative of respective spectral components of average noise level, e.g. corresponding to selected frequency bands like 1/1 octave or 1/3 octave levels etc. going towards the full frequency spectrum.

The acoustic sensor/noise detection module 40 may also be arranged to calculate a peak value indicative of a peak noise level for a period of time. In addition, the acoustic sensor/noise detection module 40 may be arranged to calculate a plurality of different values indicative of the noise level for the period of time, these could be statistical parameters such as the mean, RMS value, the standard deviation or higher order moments. By measuring over a period of time and processing the measured signals, it is possible to reduce the amount of data to be communicated from the acoustic sensor.

Hereby both long time evaluated noise level (calculated from multiple noise measures acquired over a distribution of times) and/or instantaneous noise measure (only a single noise measure) may be provided, the main difference being the time scale involved in producing these numbers.

Still referring to FIG. 1A, the consumption meter 50 further comprises communication means or a communication unit 60 configured to receive a leak detection control signals 110 e.g. a first leak detection control signal 111 and a second leak detection control signal 112. The acoustic sensor consumption meter also comprises communication means configured to transmit results of the measured noise signals or noise measures 120 (noise measurement data) e.g. the state noise measure 121 and the baseline noise measure 122.

The leak detection control signal 110 comprises measurement synchronization information. The synchronization information can be in form or an absolute time to start the leak detection measurements or a relative time referring to a fix point in the received leak detection control signal e.g. first bit in a synch word or last symbol in a data packet carrying the leak detection control signal. The Leak detection control signal 110 optionally comprises a duration information specifying the time duration of the leak detection measurements. The time synchronisation module will use the measurement synchronisation information and duration information for timing the period wherein the leak detection measurement is performed.

FIG. 1B discloses an external device in form of a detector or remote control 100, e.g. a leak detector unit, comprising a transceiver configured to send leak detection control signals 110 and to a receive noise measures 120, e.g. the first and second leak detection control signals 111, 112 and noise measures 121, 122. Further, the external device or detector 100 may be configured to and provided with means for determining the present state of a pipe subsystem 20 as a function of the state noise measure 121 and the baseline noise measure 122. The external device/detector or remote control 100 may be a smartphone with a respective software application. The smartphone may communicate with the communication units 60 of the leak detection sensor 42, 50 via a through a public cellular network and/or directly via communication unit. This may be possible by any suitable wireless communication standard.

The external device 100 is configured to send leak detection control signals 110 to a plurality of leak detection sensors 42, 50 arranged in the utility distribution network 20. The leak detection control signals comprises 110 measurement synchronization information specifying the point in time to start the leak detection measurements. By specifying the same starting time point for leak detection measurements the noise measurement data 120 is acquired simultaneously/time coincident in the plurality of leak detection sensors. If the time point is specified as an absolute time point the leak detection sensor 42, 50 must have an synchronized Real Time Clock (RTC). The RTC can be synchronized against the time in a public cellular communication network, a GPS receiver, or a RTC time source in the external device.

The leak detection sensor 42, 50 and the external device 100 may be used in a method for leak detection in a utility distribution network 20. A plurality of leak detection sensors 42, 50 including a noise detection module 40 for leak detection, and a control device comprising a bi-directional communication unit 60 comprising a time synchronization module for time synchronization of measurements are arranged in a utility distribution network. The external device is arranged for communication with the leak detection sensors 42, 50 via the communication unit 60. The external device 100 will send leak detection control signals 110 to the leak detection sensors 42, 50. The leak detection control signal comprises a timing information for and a time duration whereby the leak detection measurements are synchronized across the leak detection sensors 42, 50 and the coincident leak detection measurements 120, 121, 122 e.g. in form of the sampled digital representation of the acoustic noise is transmitted to the external device where leak detection calculations such as correlation and triangulation are performed. A method for leak detection or at least generation of data suitable for high precision leak detection in this utility distribution network includes the following steps:

The external device 100 or a remote control 100 transmits a leak detection control signal 110 to a subset of the plurality of leak detection sensors 42, 50 to instruct the sensors to start the leak detection in form an acoustic noise measurement. The leak detection control signal 110 includes a measurement synchronization information specifying a point in time for starting leak detection measurements. A step of synchronising an internal real time clock in the leak detection sensors may optionally be included in the method. The leak detection sensors 42, 50 will in a next step receive the leak detection control signal 110 and start the leak detection measurement at the point in time specified in the leak detection control message. Thereby a step of synchronizing the leak detection sensors and the leak detection measurement is ensured. The leak detection sensors 42, 50 will generate noise measurement data 120, 121, 122 which are coincidently measured and/or sampled across the population of leak detection sensors 42, 50. In a next step the leak detection sensors 42, 50 will transmit the leak detection measurement data 120, 121, 122 to the external device 100. The leak detection sensors 42, 50 will either transmit the leak detection measurement data 120, 121, 122 autonomously or transmit the data after at request received from the leak detection sensor via the bidirectional communication unit 60. The method may include a step of storing the leak detection measurement data 120, 121, 122 in a memory of the leak detection sensor 42, 50 before transmission to the external device 100.

Figure 2:
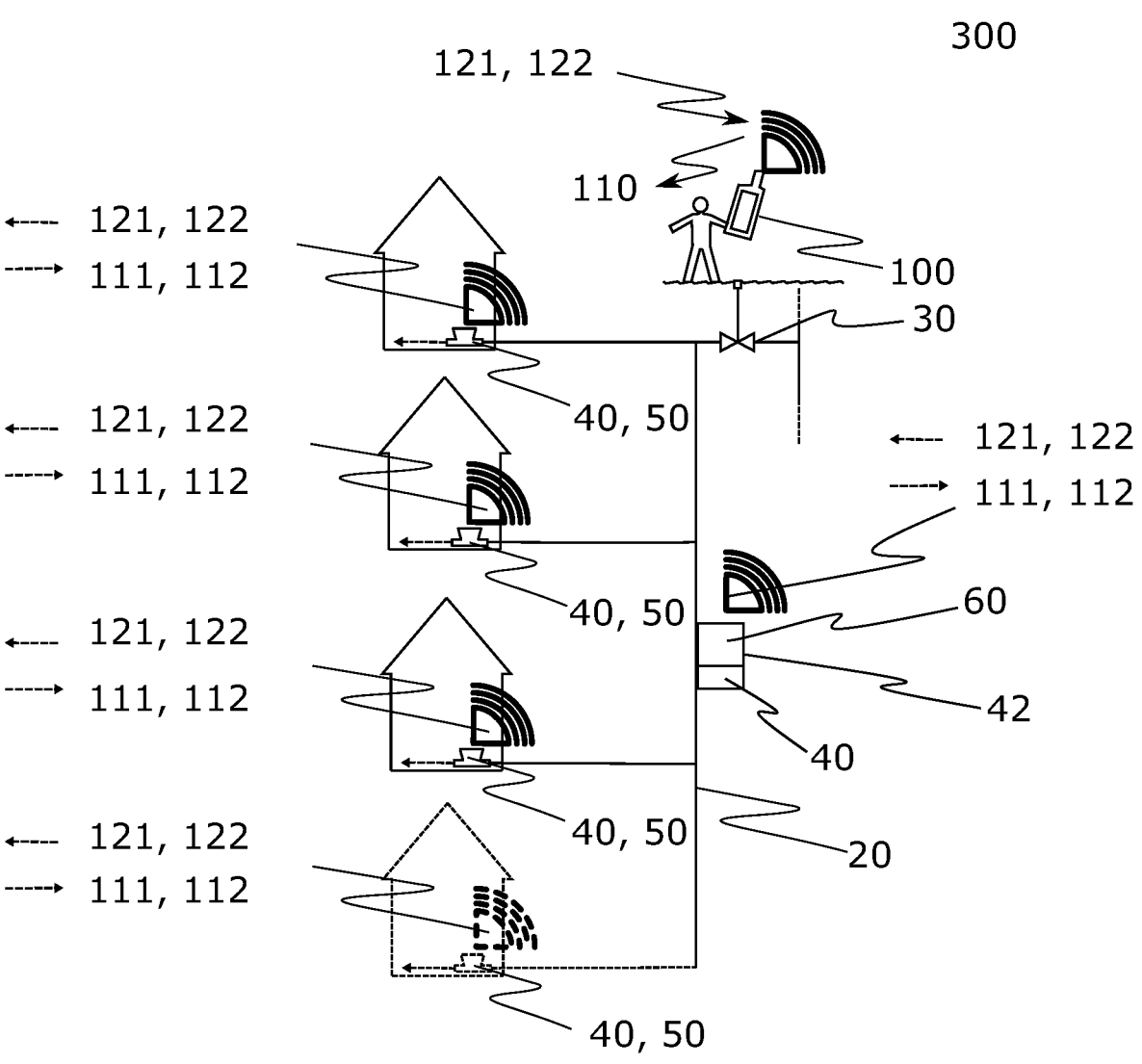
FIG. 2 illustrates a system with a pipe subsystem and multiple acoustic sensors.

FIG. 2 illustrates a fluid supply or utility distribution system to which the outlined method may be applied. The utility distribution system includes a pipe subsystem 20 arranged between an optional control valve 30 and multiple acoustic sensors 40 installed in different houses, wherein the noise detection modules or acoustic sensors 40 in this example are integrated into fluid consumption meters 50. A leak detection sensor 42 independent of a consumption meter is also installed in the utility distribution system. The leak detection sensor 42 independent of a consumption meter also comprises a leak detection module and acoustic sensors 40 and a bi-directional communication unit 60. It is understood that the system may comprise multiple leak detection sensor 42 independent of a consumption meter whereby the leak detection is improved. The external device in form of a detector 100 is configured as previously outlined and further configured to communicate and interact with multiple acoustic sensors 40 embedded in consumption meters 50 or in leak detection sensors 42. The detector 100 is configured to transmit multiple leak detection control signals 110. As for a first acoustic sensor 40, the detector 100 is configured to transmit a first and optionally second leak detection control signals signal 111, 112 and the first acoustic sensor is configured to perform respective state and optionally baseline noise measure 121, 122. The leak detection control signals 110 comprises a timing information specifying a point in time for starting the leak detection measurements. Likewise the detector 100 is configured to interact with the second and further acoustic sensors to synchronize the leak detection measurements and determine a present state based on synchronized noise measures received from these meters.

Determining the present state of a pipe subsystem connected to multiple acoustic sensors 40 may optionally involve considering the baseline noise measures and state noise measures from multiple acoustic sensors 40. Based on the plurality of measures, the present state of the pipe subsystem or a part thereof may be determined.

Figures 3, 4:
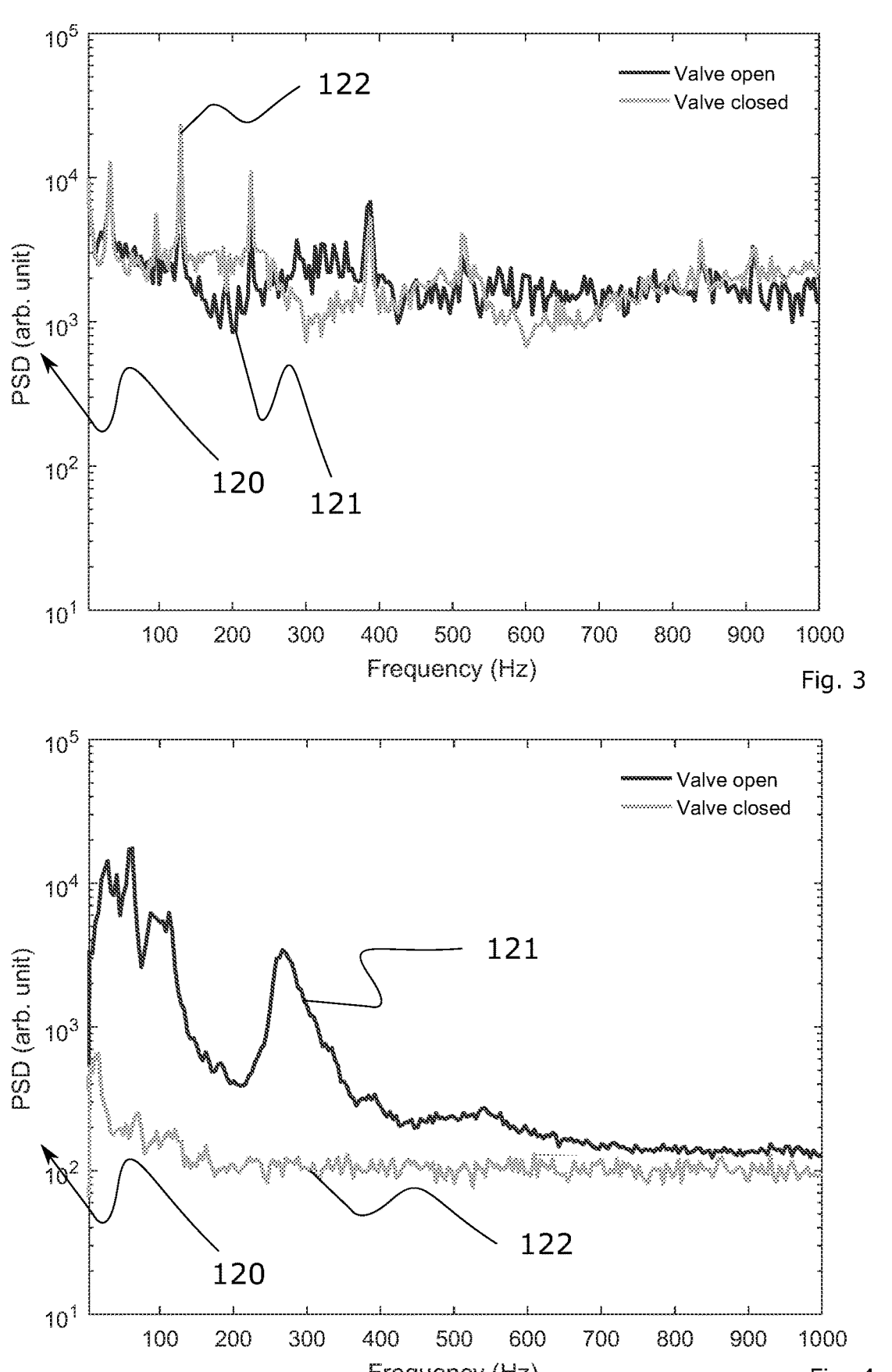
FIG. 3 illustrates state and baseline noise measures; e.g. from inside a house.
FIG. 4 illustrates state and baseline noise measures; e.g. from outside a house.

With reference to FIGS. 3 and 4, the process of determining the present state of a pipe subsystem will be described in the following. FIGS. 3 and 4 illustrates different scenario and each shows two different noise measures 120 established by the acoustic sensor and/or consumption meter 50. The noise measures 120 are illustrated as Power Spectrum Density (PSD). One noise measure is the state noise measure 121 illustrating the acoustic profile of the pipe subsystem when the control valve 30 is open and the other is the baseline noise measure 122 illustrating the acoustic profile of the pipe subsystem when the control valve 30 is closed. In this regard reference is made to FIGS. 3 and 4 illustrating pipe subsystems arranged between an optional control valve 30 and one or more acoustic sensors 40, respectively.

In the scenario illustrated in FIG. 3, the difference between the baseline noise measure and the state noise measure is less significant indicating that the acoustic sensor 40 mainly detects "local noise", being noise originating from the local piping network of the specific installation. This could be the piping network of a domestic house and the noise could originate from circulation pumps, heat exchangers or the like installed inside the house.

FIG. 4 illustrates another scenario wherein the difference between the baseline noise measure and the state noise measure is more significant. As seen, the state noise measure 121 indicating the acoustic profile when the control valve is open, is much higher than the baseline noise measure. The noise detected by the acoustic sensor thus mainly originates from the pipe subsystem 20 or remaining part of the utility distribution system outside the housing. Noise in this scenario would come from equipment, such as pumps or valves, installed in the utility distribution system or be caused by leaks in the utility distribution system, including the pipe subsystem.

The present state of a pipe subsection may thus be computed or derived based on one or more differences or discrepancies between the baseline noise measure and the state noise measure from an acoustic sensor. The present state of a pipe subsystem may also be computed or derived based on one or more differences or discrepancies between the baseline noise measures and the state noise measures from multiple acoustic sensors. In determining the present state, differences between baseline and state noise measures may be considered at discrete point in time over a period of time. The present state may for example be determined based on a development in the difference between baseline and state noise measures over time. An increase in the difference between baseline and state noise measures over time may for example indicate a leak that is evolving, such as growing in size. Various statistical parameters may also be derived from the development in differences between baseline and state noise measures over time and used to determine the present state.

Doing a synchronised leak detection measurement across multiple leak detection sensors improves base line noise measures as the measurements can be easily combined and compared due to the time coincidence. Time discrete noise sources will have less influence as they will be present in all time coincident measurements.

Figure 5:
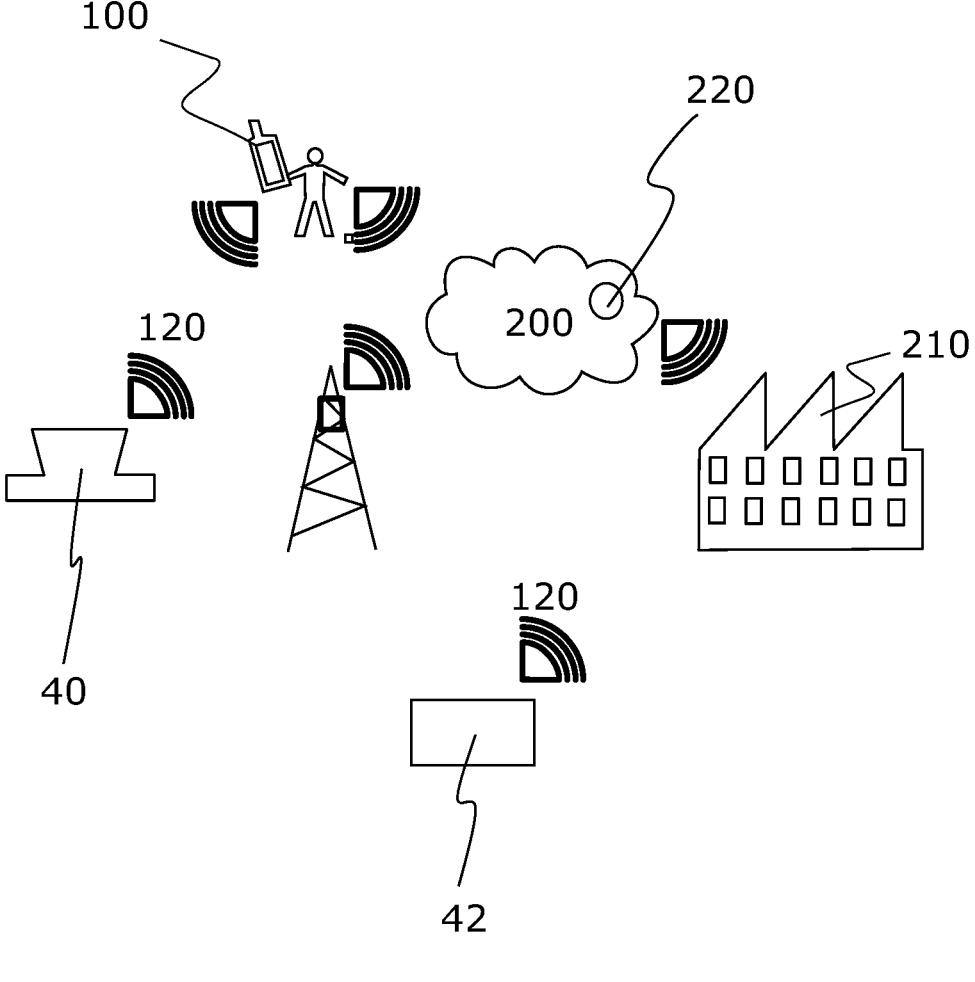
FIG. 5 illustrates embodiments of computational implementations.

FIG. 5 illustrates a configuration where the method is performed by using an external device in form of: a remote control or a detector 100; a decentralized processor or cloud based processor 200; or a central processor 210. In this configuration the external device comprises more than one device and must be understood as a collection of devices. Noise measures 120 from an acoustic sensor 40 may be transmitted to a cloud 200 directly, via a communications system or via a detector 100, or via a separate special communication network for the acoustic sensors 40.

The method of determining the present state of a pipe subsystem such as detecting a leak may involve an act of receiving one or more time synchronized noise measures 120 in a decentralized processor or cloud based processor 200; or a central processor 210. Likewise the act of determining may be performed by one or more of a decentralized processor or cloud based processor 200; or a central processor 210. In particular complex data analysis may be provided by a cloud based processor 200 or control processor 210. The results from one or more acoustic sensors 40, 42, 50 may be communicated to and managed by a company. The company may prioritize leaks and organize repairs accordingly.

The acoustic sensor and the detector/external device described above may also be part of a detection kit or leak detecting system 300 comprising means for carrying out the acts as disclosed. That is the nonmanual acts. Such detection kit or leak detection system may be used for determining a present state of a pipe subsystem 20. The detection kit may also be configured to detect leaks in the pipe subsystem.

Figure 6:
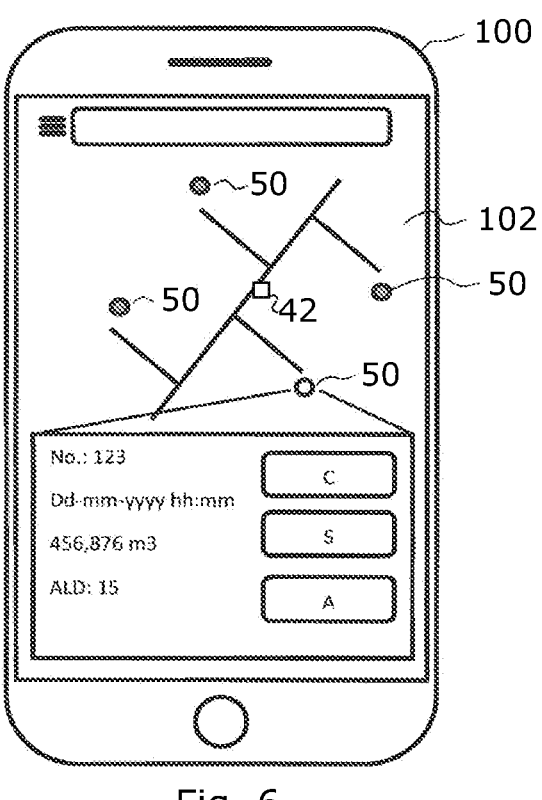
FIGS. 6, 7 and 8 illustrate an external device/remote control with three different views of the display.
Figure 7:
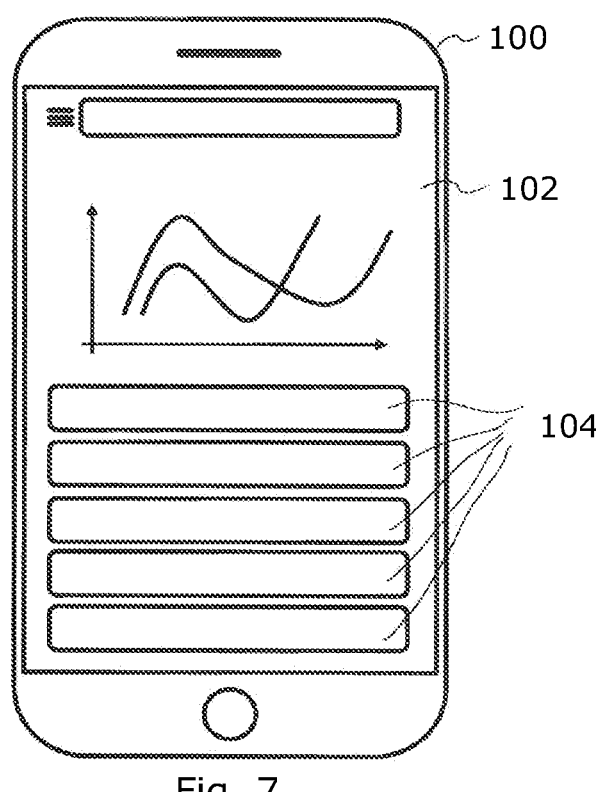
Figure 8:
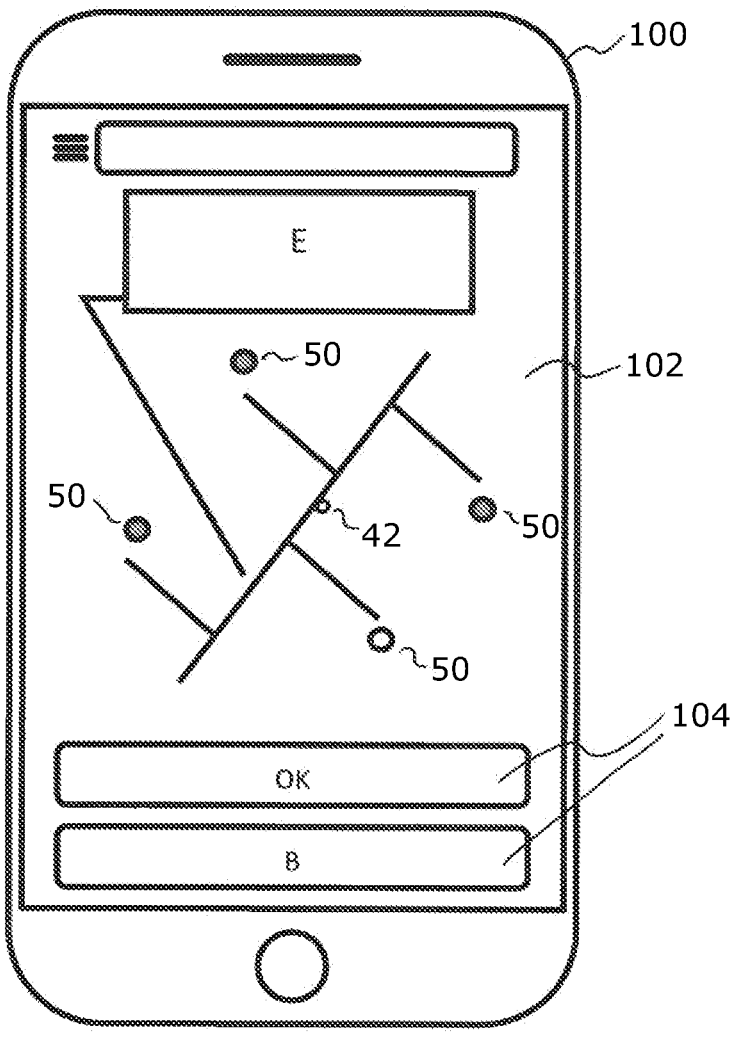

With reference in particular to FIGS. 6 to 8 a further aspect is described by way of example. In this example the external device/detector 100 is a smartphone 100 forming a remote control with a software application for leak detection. The remote control 100 has a display 102 visualizing the liquid supply network or pipe system with the different acoustic sensors 40 provided in the consumption meters 50 and an independent leak detection sensor 42 which are available in the pipe system. As shown in FIG. 6 the user may touch on the respective sensor 42 or consumption meter 50 shown in the map to see detailed information and to choose an action. This action may be clicking on one of the three keys C, 5 and A which allow to connect C, to receive a status 5 or start an analysis A. When clicking A the smartphone 10 will send a leak detection control signal to the special sensor 42 or the consumption meter 50 identified by a certain address, in this example "123". This leak detection control signal may be sent directly to the communication unit 60 of the consumption meter 50 or leak detection sensor 42 using a suitable wireless communication standard which is implemented in the communication unit 60 and in the remote control 100. Alternatively, it is possible, that the signal is sent from the remote control 100 via a mobile communication network to a central computer like a decentralized processor 200 and then send via a separate communication network to the communication unit 60. Thus, there may be a direct or indirect communication between the remote control 100 and the communication unit 60. When receiving the leak detection control signal the consumption meter 50 is synchronized with the remote control and set in a leak detection mode starting an acoustic or noise measurement by using the acoustic sensor 40 at the time specified in the measurement synchronization information comprised in the leak detection control signal, i.e. starts listening into the pipe system and measuring acoustic noise data at the specified time. More leak detection sensors 40, 42, 50 may receive a leak detection signal specifying the time point for leak detection measurements. The simultaneously measured data then may be sent back directly to the remote control 100 or via the network to the decentralized processor 200 or the central processor 210 for data analysis. The result of the data analysis then is sent back to the external device 100 to be visualized on its display 102. The remote control and the consumption meter may synchronize an internal real time clock between them or it may be synchronized via the public cellular communication network.

For the data analysis the remote control 100 may offer several options as for example shown in FIG. 7. In this status the display 102 can visualize the measurement results of acoustic sensor 40, i.e. a flow consumption meter 50 or leak detection sensor 42. The display 102 may offer different virtual keys 104 to select further options. This, for example may be the playback of the sampling, a frequency analysis, a calculation of the leak location, to save the result and to show the final analysis. The final analysis or detection of the leak may be displayed as shown in FIG. 8. In this step the display 102 again shows the map of the pipe system with the position of E of the estimated leak location. There are again offered virtual keys 104 for choosing further actions like saving the results or going back.

The use of a remote control 100 like a smartphone having a display 102 showing a map of the pipe system makes it easy to choose those leak detection sensors 42 and flow consumption meters 50 which should send noise measurement for localizing the leak. By using several time synchronized sensors 40 a correlation can be made to better localize the leak in the system. The use of different sensors like the sensors 40 in the flow consumption meters 50 and independent leak detection sensors 42 may give rise to the problem that they are not using the same data protocol, i.e. "do not speak the same language". To overcome this problem there may be arranged a signal harmonization module 220 in the system. In this example this module is shown as part of the centralized processor 200. However, one or more signal harmonization modules 220, which preferably are software modules, may be arranged at any suitable device in the system.

Since the energy supply of the fluid consumption meters 50 is provided by batteries the management of the energy consumption of the meters 50 is very important. Thus, the control device inside the flow consumption meter 50 is configured to reject the leak detection mode in case that there is not enough remaining energy in the battery to ensure the lifetime of the fluid consumption meter 50. This may be done by just counting the number of uses of the leak detection mode or by measuring the remaining battery capacity.

| No | Item |
|----|------|
| 20 | Pipe subsystem |
| 30 | Control valve |
| 40 | Acoustic sensor/noise detection module |
| 42 | Leak detection sensor |
| 50 | Consumption meter |
| 60 | Communication unit |
| 100 | External device, Detector, remote control, smartphone |
| 102 | Display |
| 104 | Virtual keys |
| 110 | Leak detection control signal |
| 111 | First leak detection control signal |
| 112 | Second leak detection control signal |
| 120 | Noise measures |
| 121 | State noise measure |
| 122 | Baseline noise measure |
| 200 | Decentralized processor |
| 210 | Central processor |
| 220 | Signal harmonization module |
| 300 | Leak detection system |

The invention claimed is:

1. A fluid consumption meter configured to measure a flow rate of a fluid and comprising:

a noise detection module for leak detection measurements, and a control device comprising a bi-directional communication unit;

wherein the control device further comprises a time synchronization module for time synchronization of leak detection measurements with an external device via the bi-directional communication unit with a time synchronization error of less than 1000 micro seconds; and wherein the control device is arranged to receive a leak detection control signal from the external device via said bi-directional communication unit, to start leak detection measurements at a point in time specified in measurement synchronization information comprised in the received leak detection control signal, and to transmit leak detection measurement data from said leak detection module via said bi-directional communication unit.

2. The fluid consumption meter according to claim 1, wherein the time synchronization error is less than 100 micro seconds.

3. The fluid consumption meter according to claim 1, wherein the received leak detection control signal includes information regarding a time duration for performing the leak detection measurements.

4. The fluid consumption meter according to claim 1, wherein the noise detection module is further arranged to sample and convert the leak detection measurement data to a digital representation.

5. The fluid consumption meter according to claim 4, wherein the control device or noise detection module is arranged to start the leak detection measurements such that a sampling time is synchronized with the measurement synchronization information comprised in the received leak detection control signal.

6. The fluid consumption meter according to claim 4, wherein the noise detection module is arranged to sample the leak measurement data with a sampling interval larger than 50 micro seconds.

7. The fluid consumption meter according to claim 6, wherein the sampling interval is at least double the time synchronization error, preferably five times larger than the time synchronization error, and more preferably ten times larger than the time synchronization error.

8. The fluid consumption meter according to claim 1, wherein the bi-directional communication unit is a 5th generation cellular communication interface.

9. A leak detection system for leak detection in a fluid supply system comprising:

one or more fluid consumption meters according to claim 1, and an external device having at least one bi-directional communication device and comprising a time synchronization module for time synchronization of leak detection measurements with a time synchronization error of less than 1000 micro seconds, wherein the external device is configured for communication with the communication unit of the one or more fluid consumption meters, and to send the leak detection control signal comprising measurement synchronization information to said one or more fluid consumption meters whereby the leak detection measurements are time synchronized.

10. The leak detection system according to claim 9, further comprising at least one leak detection sensor being independent from the one or more fluid consumption meters.

11. The leak detection system according to claim 10 wherein the external device is arranged to send leak detection control signals to the at least one or more fluid consumption meters and the at least one leak detection sensor being independent from the at least one or more fluid consumption meters, wherein the leak detection control signals comprise measurement synchronization information specifying a time for starting the leak detection measurements which are synchronized for the one or more fluid consumption meters and the at least one leak detection sensor being independent from the one or more fluid consumption meters.

12. The fluid consumption meter according to claim 1, wherein the time synchronization error is less than 10 micro seconds.

13. The fluid consumption meter according to claim 1, wherein the time synchronization error is less than 1 micro second.

14. The fluid consumption meter according to claim 4, wherein the noise detection module is arranged to sample the leak measurement data with a sampling interval larger than 100 micro seconds.

15. The fluid consumption meter according to claim 4, wherein the noise detection module is arranged to sample the leak measurement data with a sampling interval larger than 200 micro seconds.

16. A method for leak detection in a water utility distribution network comprising an external device or remote control and a plurality of leak detection sensors having a noise detection module for leak detection, and a control device comprising a bi-directional communication unit and comprising a time synchronization module for time synchronization of noise detection with a time synchronization error of less than 1000 micro seconds, the method comprising the steps of:

transmitting from the external device or remote control to the plurality of leak detection sensors a leak detection control signal comprising detection synchronization information specifying a point in time for starting noise detections;

receiving in the plurality of leak detection sensors the leak detection control signal;

starting in the plurality of leak detection sensors noise detections at the point in time specified in the detection synchronization information comprised in the received leak detection control signal, whereby noise detections in the plurality of leak detection sensors are time synchronized;

sending from the plurality of leak detection sensors to the external device or remote control noise detection data detected by the noise detection module.

17. The method according to claim 16, wherein the plurality of leak detection sensors comprises at least one leak detection sensor embedded in a consumption meter and at least one leak detection sensor being independent from the consumption meter.

18. The method according to claim 16, wherein the noise detection data sent to the external device or remote control from the plurality of leak detection sensors are correlated to detect a leak or a position of the leak.

19. The method according to claim 16, wherein the leak detection control signal is sent to a subset of the leak detection sensors.

* * * * *